(12) United States Patent
Moore et al.

(10) Patent No.: US 12,502,747 B2
(45) Date of Patent: Dec. 23, 2025

(54) METHOD AND SYSTEM FOR TRANSPORTING A WORKPIECE IN A MANUFACTURING ENVIRONMENT

(71) Applicant: The Boeing Company, Chicago, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 316 days.

(21) Appl. No.: 18/048,914

(22) Filed: Oct. 24, 2022

(65) Prior Publication Data

US 2023/0135678 A1 May 4, 2023

Related U.S. Application Data

(60) Provisional application No. 63/275,020, filed on Nov. 3, 2021.

(51) Int. Cl.
*B62D 65/18* (2006.01)
*B23Q 7/00* (2006.01)
(Continued)

(52) U.S. Cl.
CPC ............. *B23Q 17/22* (2013.01); *B23Q 7/005* (2013.01); *B66C 19/00* (2013.01); *B66C 23/62* (2013.01); *B64F 5/10* (2017.01)

(58) Field of Classification Search
CPC ........ B23Q 17/22; B23Q 7/005; B23Q 3/186; B23Q 7/04; B23Q 7/046; B23Q 17/2438;
(Continued)

(56) References Cited

U.S. PATENT DOCUMENTS

| 4,382,728 A | 5/1983 | Anderson et al. |
| 4,486,128 A | 12/1984 | Baker et al. |

(Continued)

FOREIGN PATENT DOCUMENTS

| CN | 206579860 | 10/2017 |
| CN | 110239741 | 9/2019 |

(Continued)

OTHER PUBLICATIONS

English translation of CN-210908917-U (Year: 2020).*

(Continued)

*Primary Examiner* — Jun S Yoo
(74) *Attorney, Agent, or Firm* — Walters & Wasylyna LLC

(57) ABSTRACT

A method for transporting a workpiece from an initial work cell to a subsequent work cell in a manufacturing environment having a plurality of work cells, the workpiece is supported by a support beam. The method includes monitoring the initial work cell for presence of a ready-to-move condition and monitoring the subsequent work cell for presence of a ready-to-receive condition. When both the ready-to-move condition and the ready-to-receive condition are present, the method includes interfacing the support beam with a gantry and, after the interfacing, moving the support beam with the gantry from the initial work cell to the subsequent work cell.

20 Claims, 14 Drawing Sheets

(51) Int. Cl.
*B23Q 17/22* (2006.01)
*B66C 19/00* (2006.01)
*B66C 23/62* (2006.01)
*B64F 5/10* (2017.01)

(58) Field of Classification Search
CPC ..... B23Q 17/2447; B66C 19/00; B66C 23/62; B64F 5/10; B64F 5/50; B65G 43/08; B65G 35/00; B65G 43/00; B65G 47/74; B65G 2201/0214; B65G 2203/0208; B65G 2203/0266; B65G 2203/042; B65G 2203/044; B65G 2203/046; B62D 65/022; B62D 65/026; B62D 65/18
See application file for complete search history.

(56) References Cited

U.S. PATENT DOCUMENTS

| | | | |
|---|---|---|---|
| 5,088,609 A | 2/1992 | Fryc | |
| 5,817,269 A | 10/1998 | Younie et al. | |
| 6,430,796 B1 | 8/2002 | Jones et al. | |
| 7,273,333 B2 | 9/2007 | Buttrick et al. | |
| 7,334,673 B2 | 2/2008 | Boberg et al. | |
| 7,574,933 B2 | 8/2009 | Hazlehurst et al. | |
| 8,005,563 B2 | 8/2011 | Cobb et al. | |
| 8,606,388 B2 | 12/2013 | Cobb et al. | |
| 8,620,470 B2 | 12/2013 | Cobb et al. | |
| 8,733,707 B2 | 5/2014 | Stone | |
| 9,132,924 B2 | 9/2015 | Stark et al. | |
| 9,651,935 B2 | 5/2017 | Stone | |
| 9,981,367 B2 | 5/2018 | Nestleroad et al. | |
| 10,442,153 B2 | 10/2019 | Shinozaki et al. | |
| 10,520,933 B2 | 12/2019 | Stone et al. | |
| 10,710,327 B2 | 7/2020 | Butler | |
| 10,711,815 B2 | 7/2020 | Chan et al. | |
| 10,723,485 B2 | 7/2020 | Moore et al. | |
| 10,906,158 B2 | 2/2021 | Newton | |
| 10,919,746 B2 | 2/2021 | Harada | |
| 11,007,766 B2 | 5/2021 | Bye | |
| 2008/0084018 A1 | 4/2008 | Baumann et al. | |
| 2010/0011563 A1 | 1/2010 | Burns et al. | |
| 2010/0038024 A1* | 2/2010 | Brandt | B64F 5/10 901/50 |
| 2019/0084193 A1 | 3/2019 | Riedel | |
| 2019/0314964 A1* | 10/2019 | King | B60B 29/006 |
| 2020/0017238 A1* | 1/2020 | Weller | B64F 5/10 |

FOREIGN PATENT DOCUMENTS

| | | | |
|---|---|---|---|
| CN | 210908917 U | * | 7/2020 |
| DE | 10 2013006506 | | 10/2014 |
| JP | 2022016197 A | * | 1/2022 |
| KR | 101553810 B1 | * | 9/2015 |
| KR | 2016 0081556 | | 7/2016 |
| KR | 20160081556 A | * | 7/2016 |
| WO | WO 03/037564 | | 5/2003 |

OTHER PUBLICATIONS

English translation of JP-2022016197-A (Year: 2022).*
English translation of KR-20160081556-A (Year: 2016).*
English translation of KR-101553810-B1 (Year: 2015).*
European Patent Office, Extended European Search Report, App. No. 22200689.2 (Mar. 17, 2023).
Netherlands Patent Office, Search Report ad Written Opinion, App. No. NL2029839 (Jul. 29, 2022).

* cited by examiner

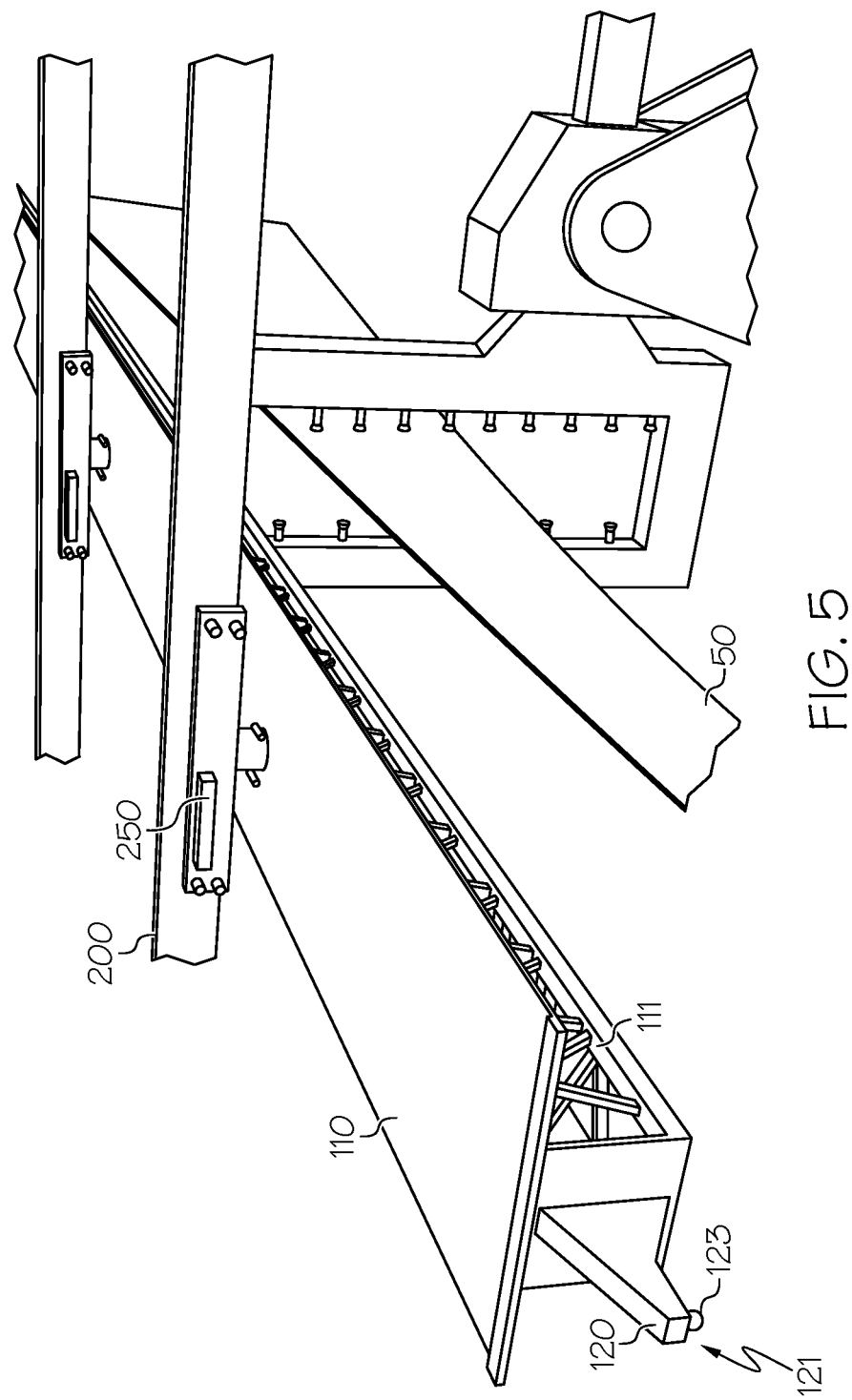

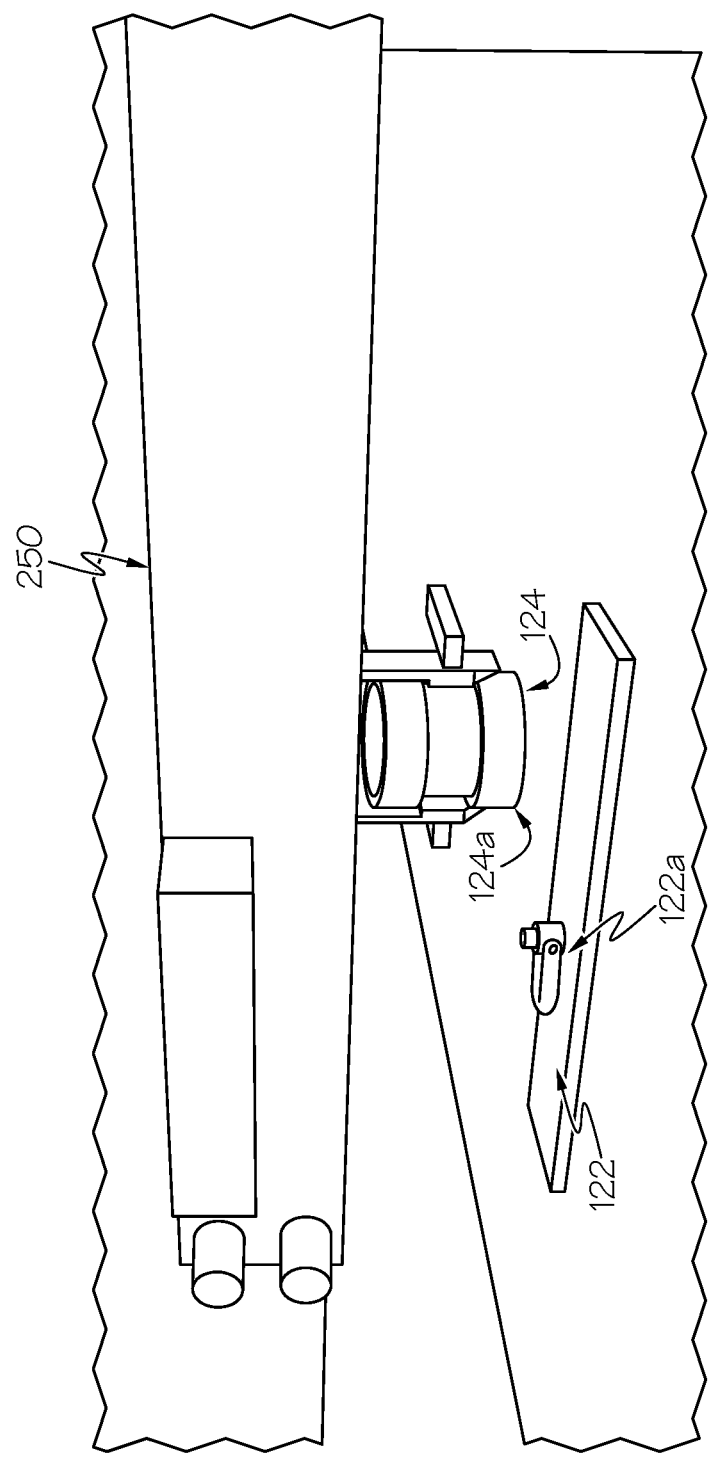

METHOD AND SYSTEM FOR TRANSPORTING A WORKPIECE IN A MANUFACTURING ENVIRONMENT

PRIORITY

This application claims priority from U.S. Ser. No. 63/275,020 filed on Nov. 3, 2021.

FIELD

This application relates to the manufacturing of structures and, more specifically, to methods and systems for transporting aerospace structures during manufacturing.

BACKGROUND

Manufacturing of large structures in the aerospace industry typically requires manual processing, manually placing the structure into a workstation, and manually moving it out of the workstation Challenges arise related to proper orientation and support of large structures within a work cell, specifically in work cells utilizing overhead mechanical equipment. Other difficulties arise related to movement of large structures into and out of work cells, and more particularly to automated transfer of large structures.

Accordingly, those skilled in the art continue with research and development efforts in the field of manufacturing large aerospace structures.

SUMMARY

Disclosed are methods for transporting a workpiece from an initial work cell to a subsequent work cell in a manufacturing environment having a plurality of work cells, the workpiece being supported by a support beam.

In one example, the method includes monitoring the initial work cell for presence of a ready-to-move condition. The method further includes monitoring the subsequent work cell for presence of a ready-to-receive condition. When both the ready-to-move condition and the ready-to-receive condition are present, the method includes interfacing the support beam with a gantry. After the interfacing, the method includes moving the support beam with the gantry from the initial work cell to the subsequent work cell.

Also disclosed are systems for transporting a workpiece from an initial work cell to a subsequent work cell in a manufacturing environment having a plurality of work cells, the workpiece being supported by a support beam.

In one example, the system includes an initial work cell sensor positioned to monitor the initial work cell for presence of a ready-to-move condition. The system further includes a subsequent work cell sensor positioned to monitor the subsequent work cell for presence of a ready-to-receive condition. The system further includes a gantry configured to interface with the support beam and move the support beam from the initial work cell to the subsequent work cell once both the ready-to-move condition and the ready-to-receive condition are present.

BRIEF DESCRIPTION OF THE DRAWINGS

FIG. 5 is a perspective view of a portion of the system of FIG. 2;

FIG. 6 is a perspective view of a portion of the system of FIG. 2;

DETAILED DESCRIPTION

Figure 1:
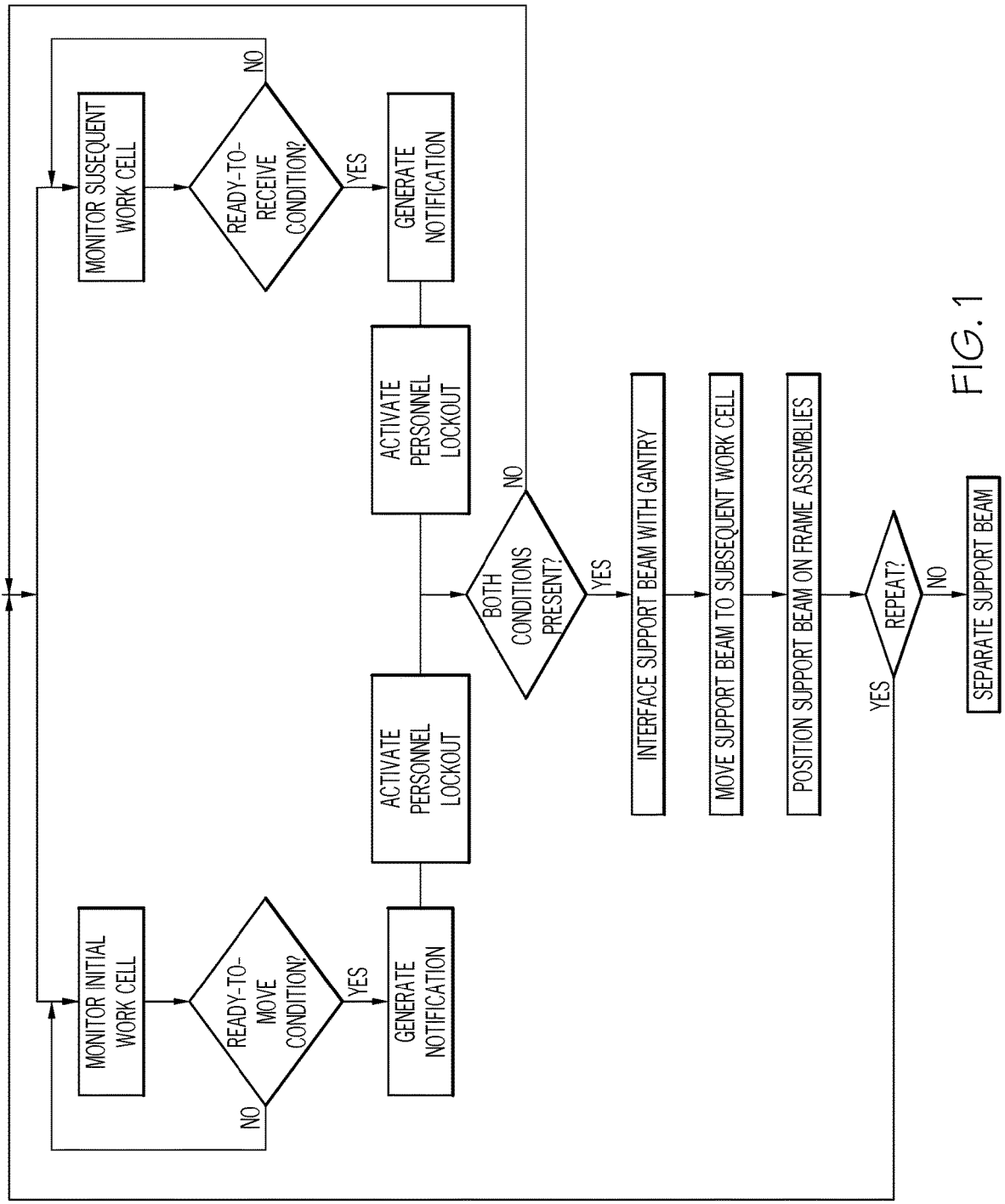
FIG. 1 is a flow chart of a method for transporting a workpiece from an initial work cell to a subsequent work cell in a manufacturing environment.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The system 100 and method 600 may be automated such that each step of the method 1000 is performed automatically based upon data 929 analysis and commands received from a control system 700. Further, any reference to moving or a movable component of the disclosed system 100 and method 1000 may refer to automated movement based upon workpiece 50 geometry and position within the system 100. For example, movement may automatically occur to position the workpiece 50 in a desired location within a work cell 30a of the system 100 for the work to be performed in that work cell on that particular shape and size of workpiece 50. Movement may include movement along any axis or plane needed to position the workpiece 50 properly within the work cell.

Figure 11:
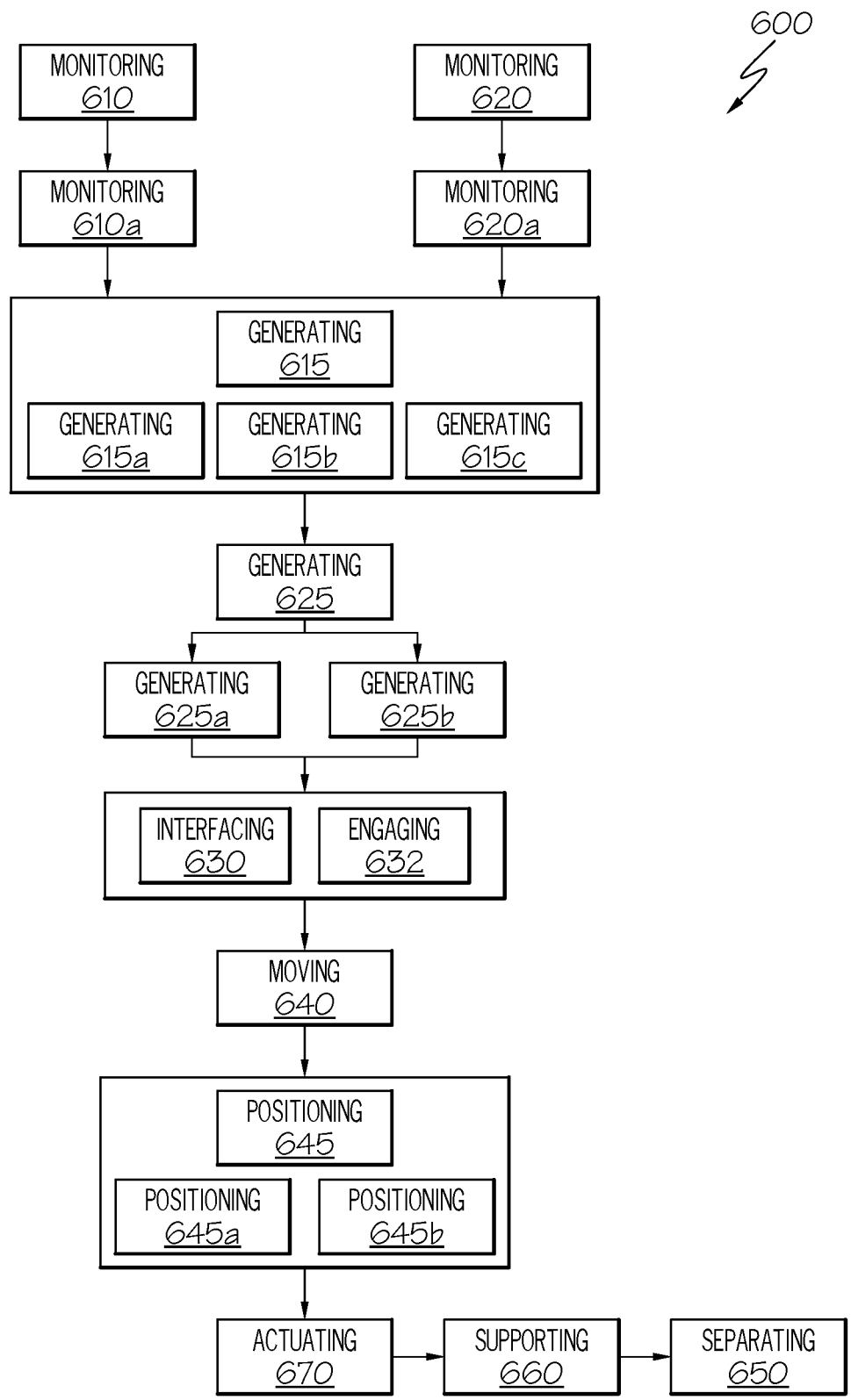
FIG. 11 is a flow diagram of a method for transporting a workpiece from an initial work cell to a subsequent work cell in a manufacturing environment.

Referring to FIG. 1 and FIG. 11, disclosed is a method 600 for transporting a workpiece 50 from an initial work cell 30a to a subsequent work cell 30b in a manufacturing environment 10. The manufacturing environment 10 includes a plurality of work cells 30. The workpiece 50 is supported by a support beam 110. Referring to FIG. 5, in one example, the support beam 110 includes a truss 111. In another example, the support beam 110 includes a metallic material and is rigid.

Figure 8:
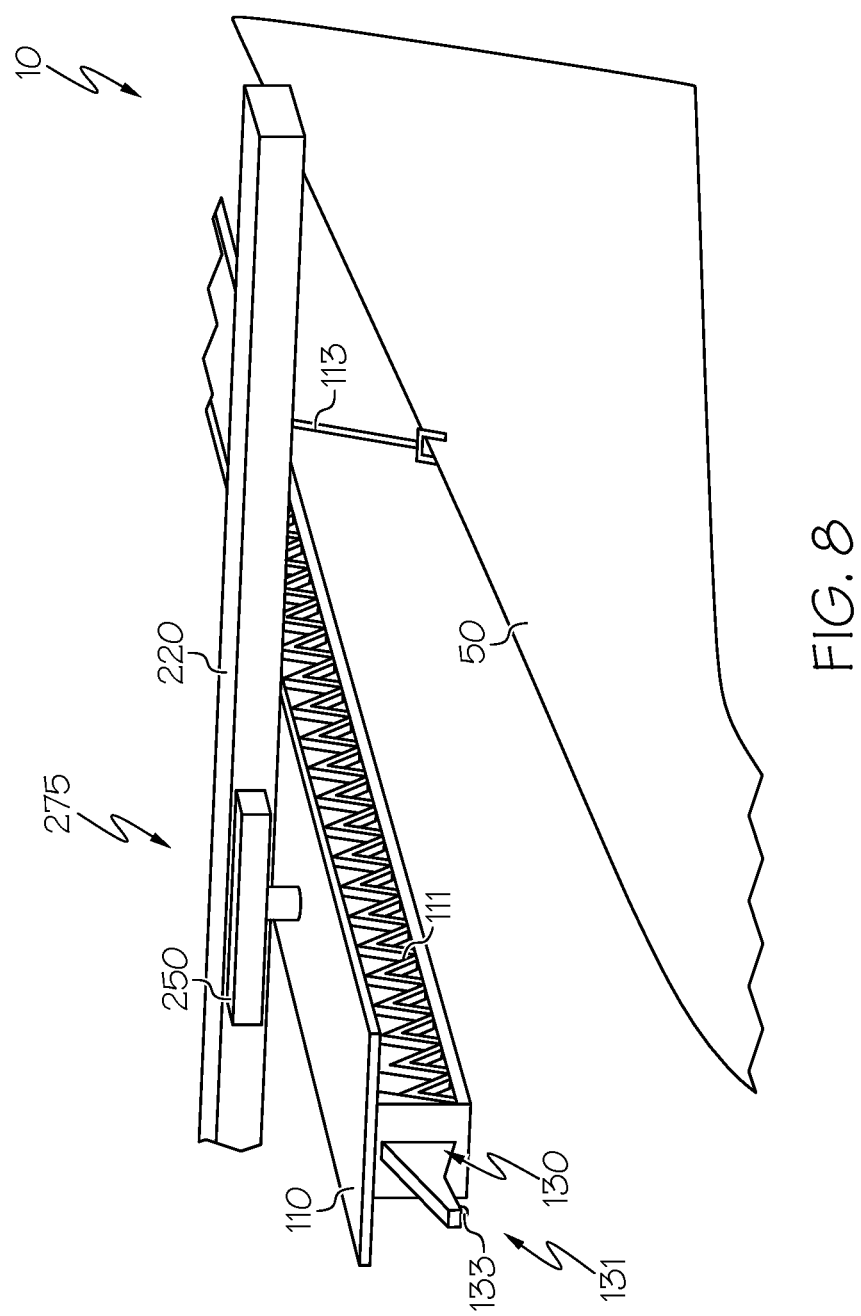
FIG. 8 is a perspective view of a portion of the system of FIG. 2.

The workpiece 50 may be suspended from the support beam 110 by a hanger 113, see FIG. 8. In one example, the workpiece 50 is a wing panel 52 of an aircraft 1302. In another example, the workpiece 50 includes a composite material 325, the composite material 325 comprising a reinforcement material embedded in a polymeric matrix material.

In one example, the method 600 includes monitoring 610 the initial work cell 30a for presence of a ready-to-move condition. The monitoring 610 may utilize an initial work cell sensor 185 positioned to monitor the initial work cell 30a for presence of a ready-to-move condition. The initial work cell sensor 185 may sense data and share it with a control system 700 for analysis. In one example, the ready-to-move condition is present when work on the workpiece 50 within the initial work cell 30a is complete.

In one example, the monitoring 610 the initial work cell 30a comprises monitoring an initial work cell sensor 185. The initial work cell sensor 185 may include at least one of a motion sensor 183, a laser sensor 181, a pressure sensor 187, a radar device 189, an RFID device 191, and a wireless device 193 to ascertain presence of personnel within the initial work cell 30a.

Still referring to FIG. 11, the method 600 includes monitoring 620 the subsequent work cell 30b for presence of a ready-to-receive condition. The monitoring 620 may utilize a subsequent work cell sensor 195 positioned to monitor the subsequent work cell 30b for presence of a ready-to-receive condition. In one example, the ready-to-receive condition is present when the subsequent work cell 30b is devoid of a workpiece 50. In another example, the ready-to-receive condition is present when a signal is received indicating that the subsequent work cell 30b is devoid of a workpiece 50. In yet another example, the ready-to-receive condition is present when the subsequent work cell 30b is devoid of a workpiece 50 and devoid of personnel.

Referring to FIG. 11, when both the ready-to-move condition and the ready-to-receive condition are present, the method 600 includes interfacing 630 the support beam 110 with a gantry 200. Further, after the interfacing 630, the method 600 includes moving 640 the support beam 110 with the gantry 200 from the initial work cell 30a to the subsequent work cell 30b.

In one example, the method 600 includes, automatically upon the presence of the ready-to-move condition, generating 615 a notification instructing all personnel to leave the initial work cell 30a. The generating 615 may be achieved with a control system 700 configured to analyzed sensed data and determine the presence of the ready-to-move condition. In one example, the generating 615 the notification includes at least one of generating 615a an audible notification, generating 615b a visual notification, and generating 615c a wireless broadcast.

In one example, the ready-to-move condition is present when a signal is received indicating that work on the workpiece 50 within the initial work cell 30a is complete. In another example, the ready-to-move condition is present when work on the workpiece 50 within the initial work cell 30a is complete and the initial work cell 30a is devoid of personnel.

In one example, the method 600 includes, automatically upon the presence of the ready-to-receive condition, generating 625 a notification instructing all personnel to leave the subsequent work cell 30b. The generating 625 the notification may include at least one of generating 625a an audible notification and generating 625b a visual notification.

In one example, the monitoring 620 the subsequent work cell 30b includes monitoring at least one of a laser sensor 181 and a pressure sensor 187 to ascertain presence of personnel within the subsequent work cell 30b.

Referring to FIG. 6, the support beam 110 includes a first coupling feature 122. In one example, the interfacing 630 the support beam 110 with the gantry 200 includes engaging the first coupling feature 122 on the support beam 110 with a second coupling feature 124 on the gantry 200. The first coupling feature 122 on the support beam 110 may include a male coupling portion 122a and the second coupling feature 124 on the gantry 200 may include a female coupling portion 124a. In another example, the interfacing 630 the support beam 110 with the gantry 200 may include raising the support beam 110 along the vertical axis V into engagement with the gantry 200.

The interfacing 630 the support beam 110 with the gantry 200 may include sensing whether the second coupling feature 124 on the gantry 200 has securely engaged the first coupling feature 122 on the support beam 110. In one example, the interfacing 630 the support beam 110 with the gantry 200 includes interfacing using a feedback control loop.

In one example, the support beam 110 comprises at least two of the first coupling feature 122. The interfacing 630 the support beam 110 with the gantry 200 may include engaging 632 the at least two of the first coupling feature 122 on the support beam 110 with at least two of the second coupling feature 124 that correspond on the gantry 200.

Figure 9:
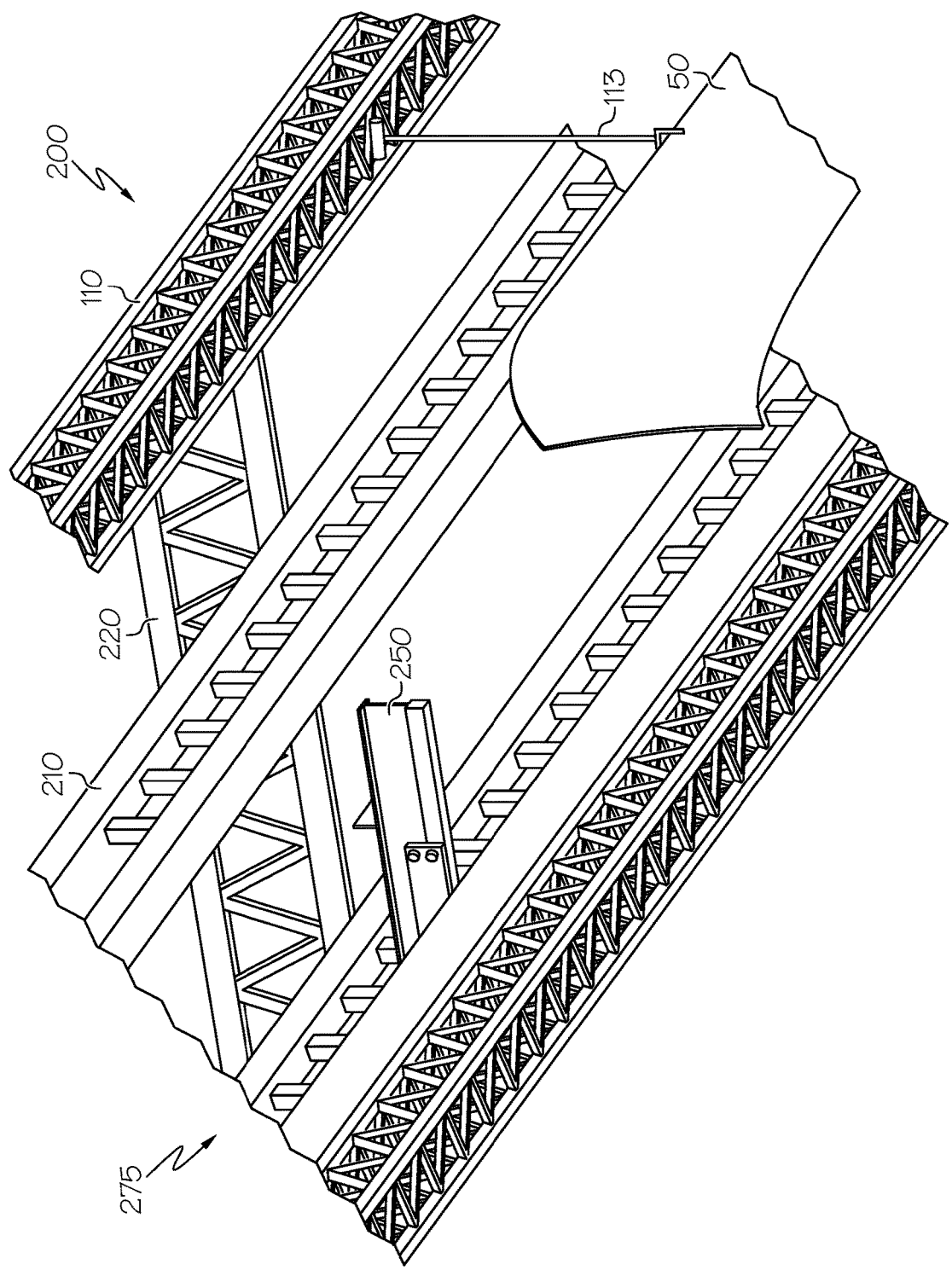
FIG. 9 is a perspective view of a portion of the system of FIG. 2.

Referring to FIG. 9, the gantry 200 includes a first elongated rail member 210 and a second elongated rail member 220 moveably engaged with the first elongated rail member 210. The gantry 200 further includes a trolley 275 that is moveably engaged with the second elongated rail member 220. The trolley 275 is coupled with an interfacing member 250, see FIG. 6, configured to engage with second coupling feature 124. The trolley 275 facilitates movement of workpiece 50 throughout the manufacturing environment 10.

Figure 2:
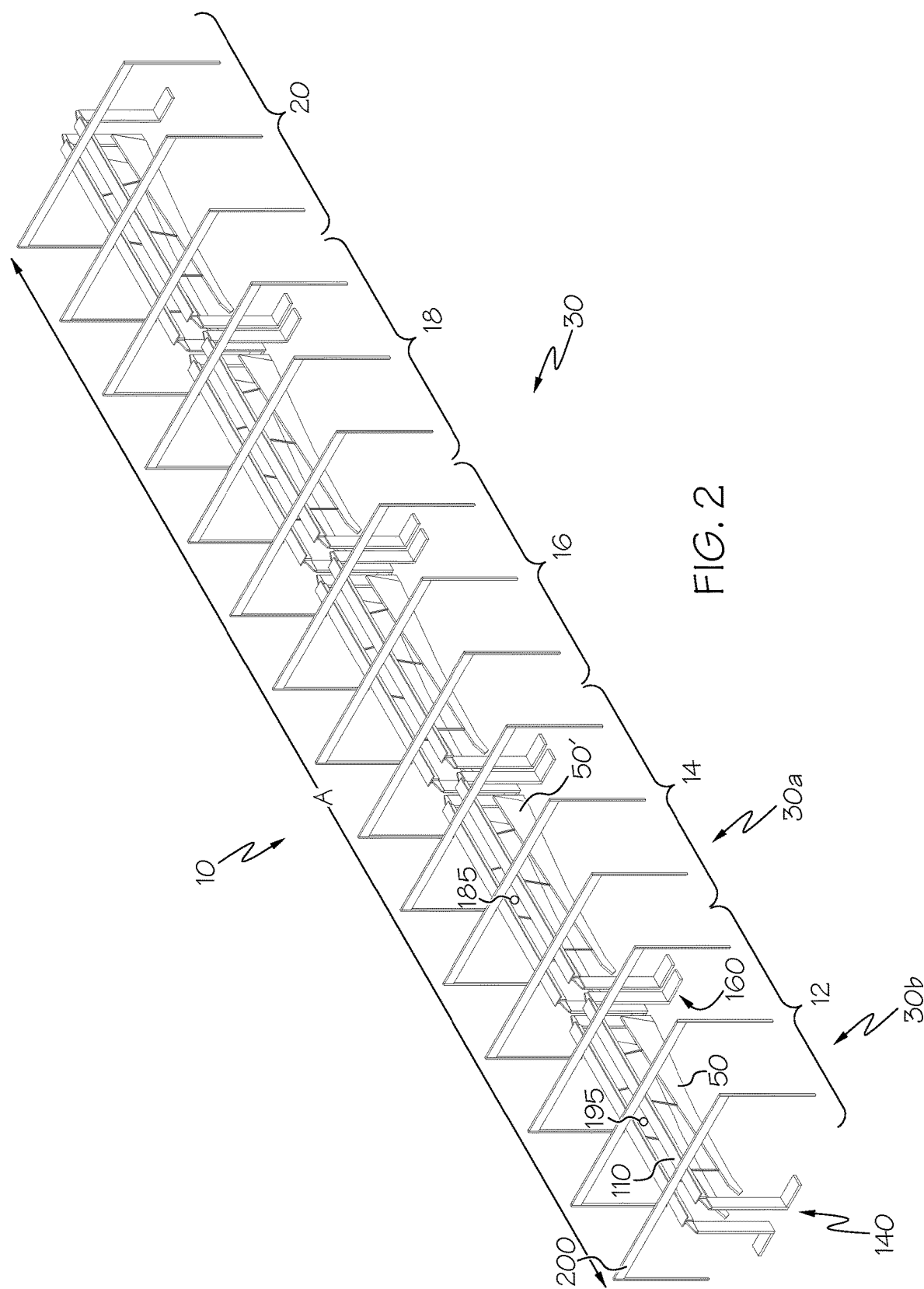
FIG. 2 is a perspective view of a system for transporting a workpiece from an initial work cell to a subsequent work cell in a manufacturing environment.
Figure 3:
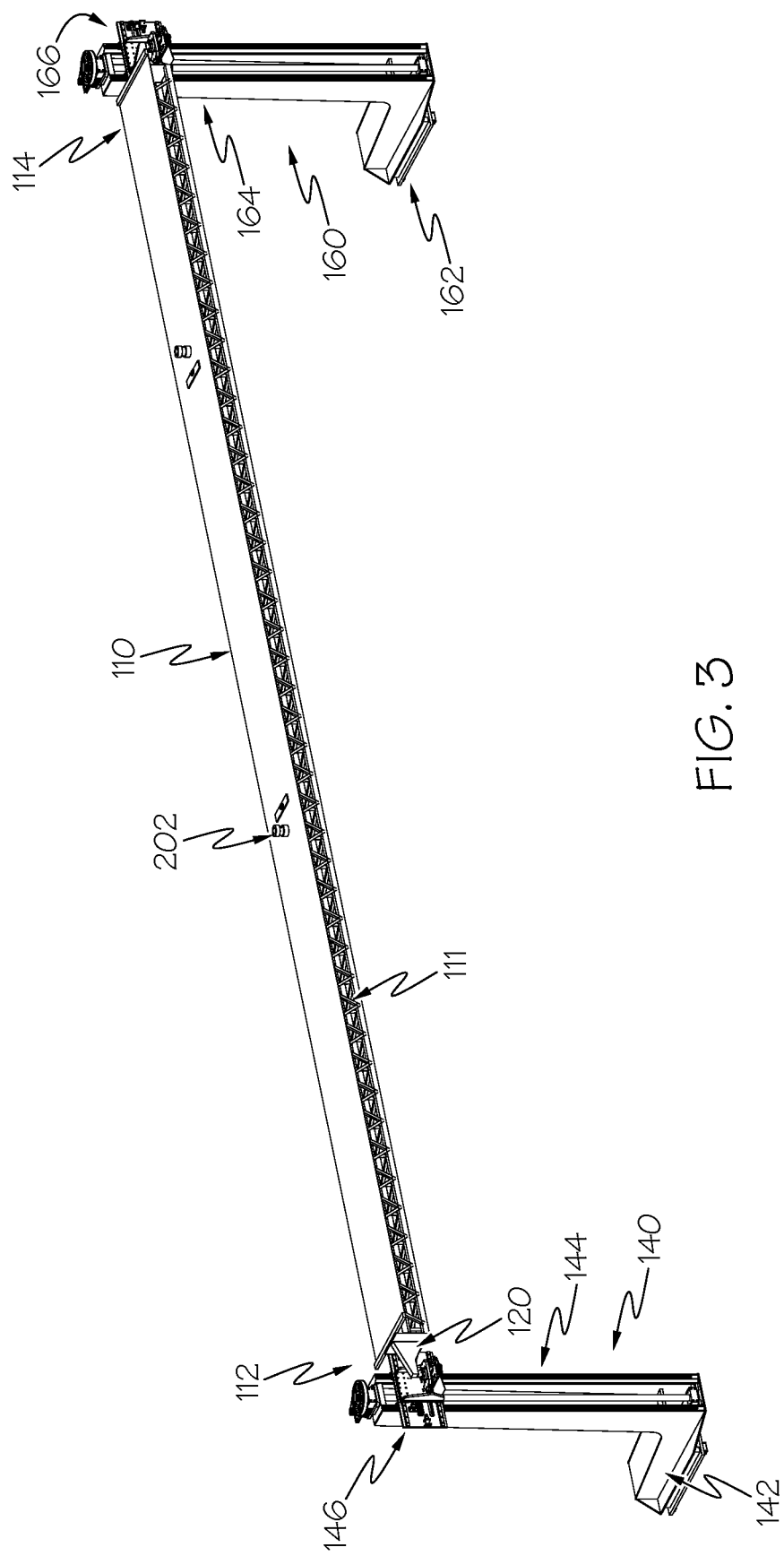
FIG. 3 is a perspective view of a portion of the system of FIG. 2.

Referring to FIG. 2, in one or more examples, the plurality of work cells 30 are arranged along a longitudinal manufacturing environment axis A. The first elongated rail member 210, see FIG. 9, is aligned with the longitudinal manufacturing environment axis A. In one example, the second elongated rail member 220 is transverse to the first elongated rail member 210 and moves relative to the first elongated rail member 210 along the longitudinal manufacturing environment axis A.

In one example, the moving 640 the support beam 110 with the gantry 200 includes moving 640 the support beam 110 in only two directions, the two directions defining a plane P that is generally perpendicular to a vertical axis V of the manufacturing environment 10. The moving 640 may be automated such that it positions the support beam 110 based upon geometry of the workpiece 50 and work cell, example 30a, parameters.

Figure 4:
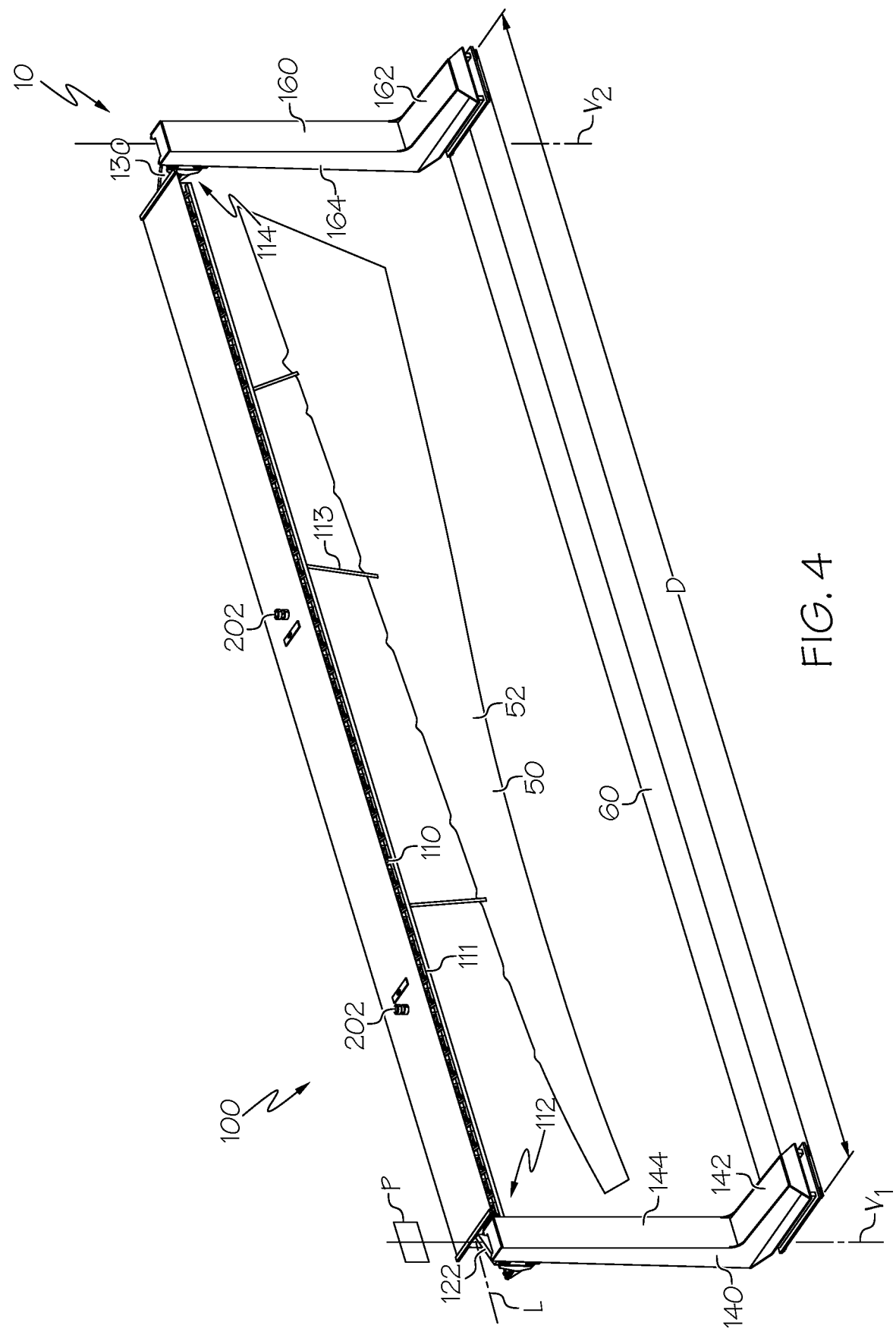
FIG. 4 is perspective view of a portion of the system of FIG. 2.

The method 600 may further include, once the support beam 110 is in the subsequent work cell 30b, positioning 645 the support beam 110 onto a first frame assembly 140 and a second frame assembly 160. Referring to FIG. 4, in one example, the first frame assembly 140 is spaced a distance D apart from the second frame assembly 160. In one example, the distance D may be at least about 1 meter. The distance D may be at least about 2 meters. In another example, the distance D may be at least about 3 meters.

Referring to FIG. 4, the support beam 110 is elongated along a longitudinal support beam axis L and includes a first end portion 112 and a second end portion 114 longitudinally opposed from the first end portion 112. The support beam 110 further includes a first beam-side indexing feature 120 proximate the first end portion 112 and a second beam-side indexing feature 130 proximate the second end portion 114, see FIG. 7A.

In one example, the first frame assembly 140 includes a first base portion 142, a first riser portion 144 defining a first vertical axis V1, and a first carriage 146. The first carriage 146 is connected to the first riser portion 144 and is moveable relative to the first riser portion 144 along the first vertical axis V1. In one example, the first carriage 146 includes a first frame-side indexing feature 148 configured to engage with the first beam-side indexing feature 120.

Referring to FIG. 4, the second frame assembly 160 includes a second base portion 162, a second riser portion 164 defining a second vertical axis V2, and a second carriage 166. The second carriage 166 is connected to the second riser portion 164 and is moveable relative to the second riser portion 164 along the second vertical axis V2. In one example, the second carriage 166 includes a second frame-side indexing feature 168 configured to engage with the second beam-side indexing feature 130.

Referring to FIG. 4, in one example, the first base portion 142 of the first frame assembly 140 is fixedly connected to an underlying floor 60 (e.g., a factory floor). Further, the second base portion 162 of the second frame assembly 160 is fixedly connected to the underlying floor 60 (e.g., a factory floor). In another example, both the first base portion 142 of the first frame assembly 140 and the second base portion 162 of the second frame assembly 160 are fixedly connected to the underlying floor 60.

Figure 7A:
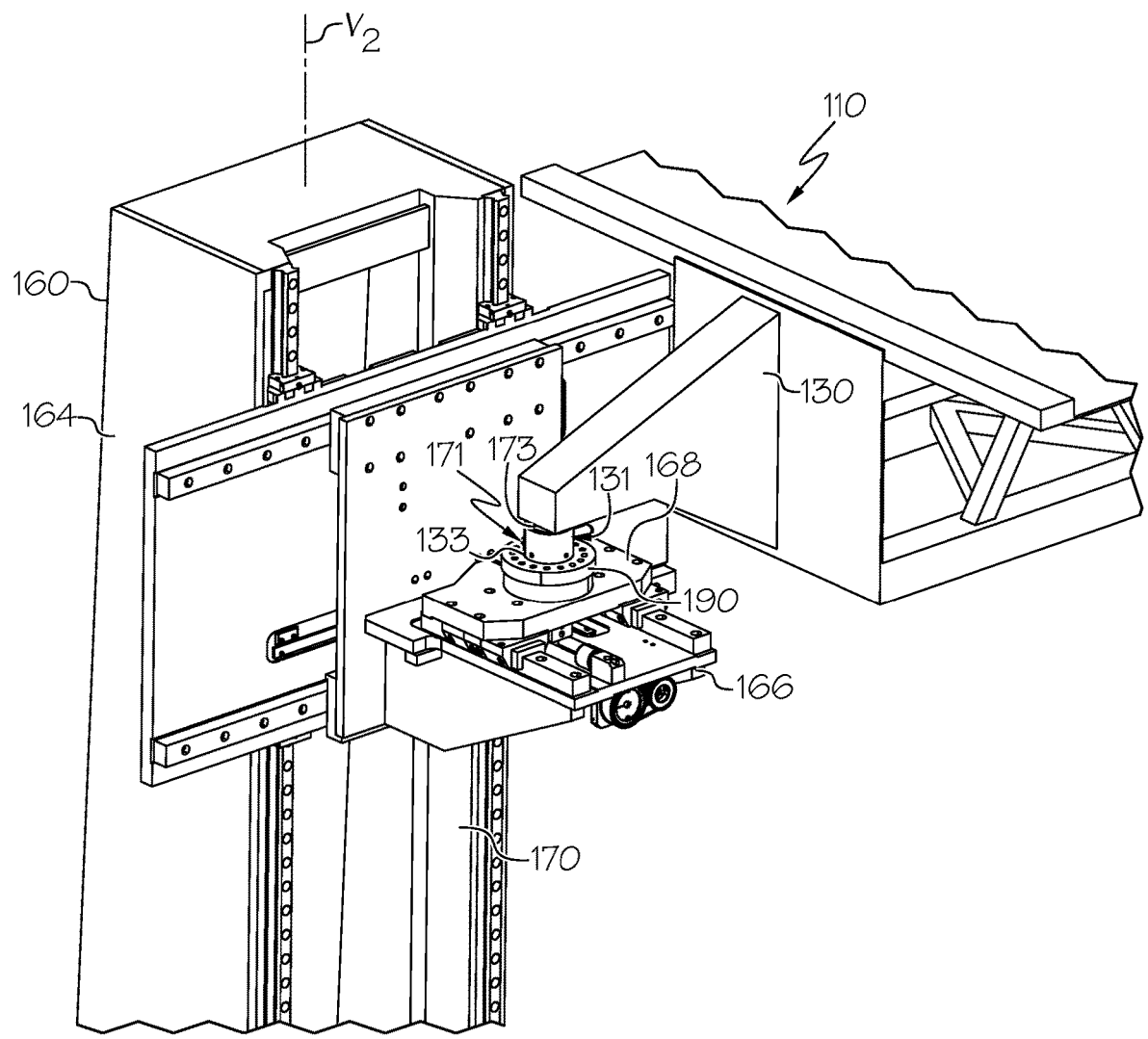
FIG. 7A is a perspective view of a portion of the system of FIG. 2.
Figure 7B:
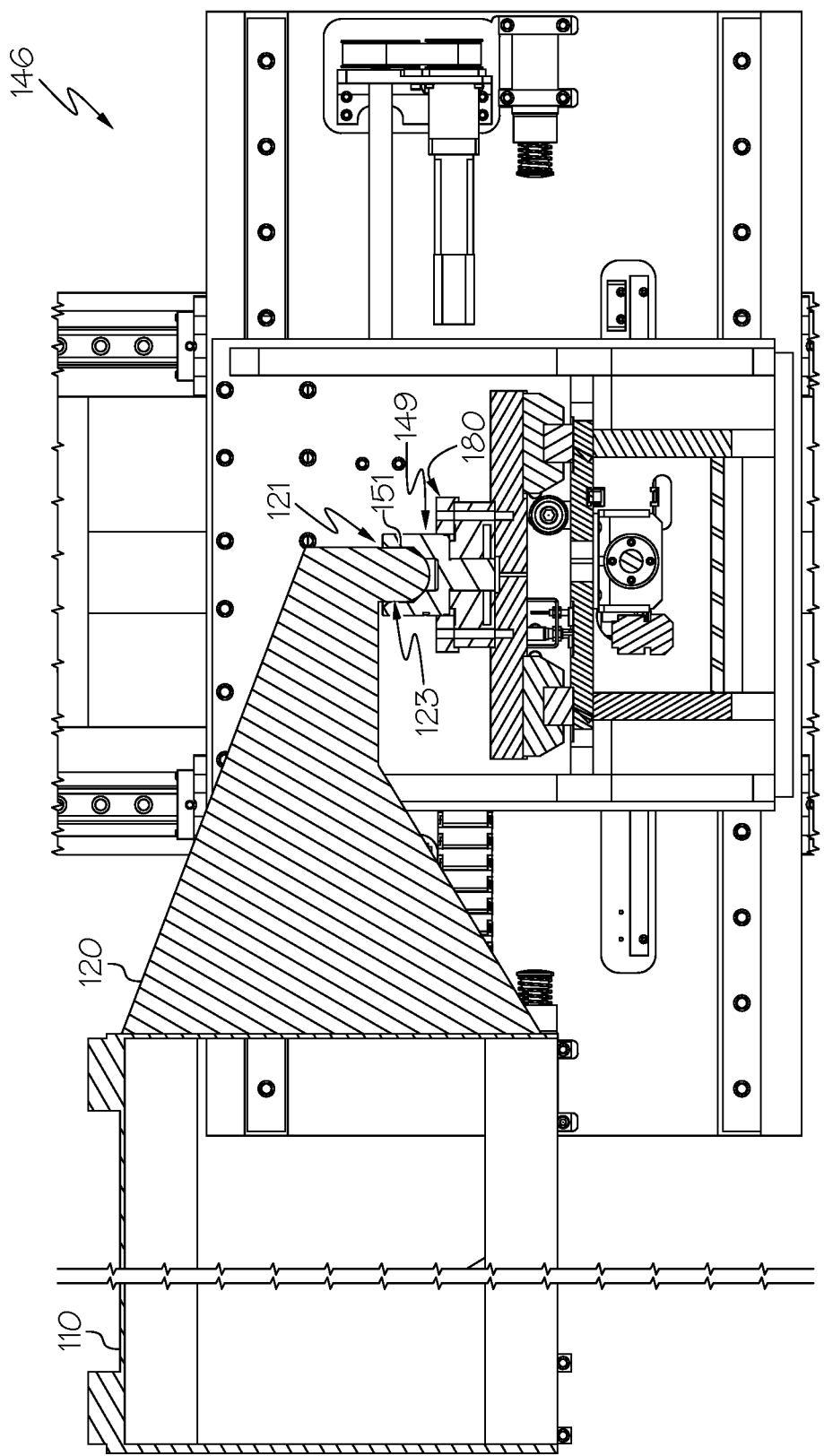
FIG. 7B is a perspective view of a portion of the system of FIG. 2.

Referring to FIG. 7B, in one example, the first beam-side indexing feature 120 comprises a first male indexing feature 121 and the first frame-side indexing feature 148 comprises a first female indexing feature 149 sized and shaped to closely receive the first male indexing feature 121. The positioning 645a the support beam 110 onto the first frame assembly 140 includes inserting the first male indexing feature 121 into the first female indexing feature 149.

Referring to FIG. 7A, in one example, the second beam-side indexing feature 130 includes a second male indexing feature 131 and the second frame-side indexing feature 168 includes a second female indexing feature 171 sized and shaped to closely receive the second male indexing feature 131. In one example, the positioning 645b the support beam 110 onto the second frame assembly 160 includes inserting the second male indexing feature 131 into the second female indexing feature 171.

Referring to FIG. 7B, in one example, the first male indexing feature 121 includes a first ball member 123 and the first female indexing feature 149 includes a first socket member 151. Referring to FIG. 7A, the second male indexing feature 131 includes a second ball member 133 and the second female indexing feature 171 includes a second socket member 173.

In one example, automatically upon the presence of the presence of the ready-to-move condition, the method 600 includes actuating 670 personnel lockouts 400 to inhibit ingress of personnel into the initial work cell 30a. The actuating 670 may be automated such that it occurs via a command from the control system 700. In one or more examples, the method 600 includes, automatically upon the presence of the presence of the ready-to-receive condition, actuating 670 personnel lockouts 400 to inhibit ingress of personnel into the subsequent work cell 30b.

Referring to FIG. 11, in one or more examples, the method 600 further includes monitoring 610a the subsequent work cell 30b for presence of a second ready-to-move condition and monitoring 620a a still subsequent work cell 30b for presence of a second ready-to-receive condition. In one example, the monitoring 610a and monitoring 620a include sensing with an initial work cell sensor 185 and a subsequent work cell sensor 195, respectively.

In one example, when both the second ready-to-move condition and the second ready-to-receive condition are present, the method 600 includes interfacing 630 the support beam 110 with the gantry 200. The method 600 further includes, after the interfacing 630, moving 640 the support beam 110 with the gantry 200 from the subsequent work cell 30*b* to the still subsequent work cell 30*b*.

Referring to FIG. 11, once all work on the workpiece 50 within the manufacturing environment 10 is complete, the method may include separating 650 the workpiece 50 from the support beam 110. After separating 650, the workpiece 50 may be positioned for further processing.

Referring to FIG. 11, the method 600 may further include supporting 660 a second workpiece 50' on the support beam 110. The second workpiece 50' may include a composite material 325, the composite material 325 comprising a reinforcement material embedded in a polymeric matrix material. The second workpiece 50' may be suspended from the support beam 110 by a hanger 113, see FIG. 8.

In one example, the plurality of work cells 30 comprise at least one of a trimming cell 40*a*, a sanding cell 40*b*, a washing cell 40*c*, a non-destructive inspection cell 40*d*, a painting cell 40*e*, and a drilling cell 40*f*, and an assembling cell 40*g*. The workpiece 50 may automatically move between each of the plurality of work cells 30 via the gantry 200 and control system 700.

In one example, the method 600 includes monitoring 610 the initial work cell 30*a* for presence of a ready-to-move condition, wherein the ready-to-move condition is present when work on the workpiece 50 within the initial work cell 30*a* is complete and the initial work cell 30*a* is devoid of personnel.

The method 600 further includes monitoring 620 the subsequent work cell 30*b* for presence of a ready-to-receive condition, wherein the ready-to-receive condition is present when the subsequent work cell 30*b* is devoid of a workpiece 50 and devoid of personnel. Once the ready-to-move condition and the ready-to-receive condition are present, a workpiece 50 located in the initial work cell 30*a* is authorized to move from the initial work cell 30*a* to the subsequent work cell 30*b*.

The method 600 further includes, when both the ready-to-move condition and the ready-to-receive condition are present, engaging 632 a first coupling feature 122 on the support beam 110 with a second coupling feature 124 on a gantry 200. After the engaging 632, the method 600 includes moving 640 the support beam 110 with the gantry 200 from the initial work cell 30*a* to the subsequent work cell 30*b*.

In one example, the moving 640 includes moving the support beam 110 in only two directions, the two directions defining a plane P that is generally perpendicular to a vertical axis V of the manufacturing environment 10.

Referring to FIG. 2, disclosed is a system 100 for transporting a workpiece 50 from an initial work cell 30*a* to a subsequent work cell 30*b* in a manufacturing environment 10. The manufacturing environment 10 includes a plurality of work cells 30. The workpiece 50 is supported by a support beam 110. In one example, the support beam 110 includes a truss 111. The support beam 110 may include a metallic material and may further be rigid. In one example, the workpiece 50 is suspended from the support beam 110 by a hanger 113, see FIG. 8.

Figure 10:
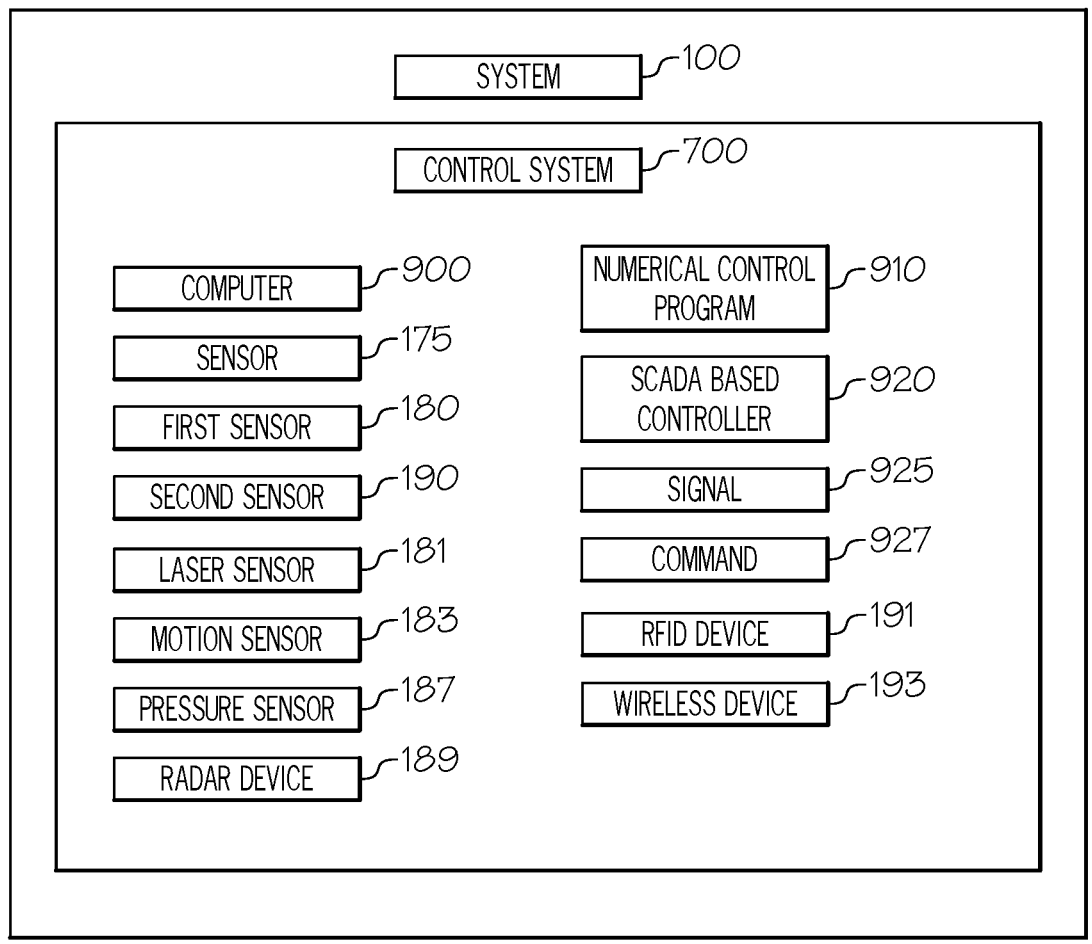
FIG. 10 is a block diagram of a control system of the system of FIG. 1.

Referring to FIG. 10, in one or more examples, the system 100 includes a control system 700. The control system 700 includes a computer 900. The computer 900 may utilize one or more numerical control program 910 to direct movement of the workpiece 50 within a work cell of the plurality of work cells 30 or between the plurality of work cells 30. The control system 700 may utilize a supervisory control and data acquisition (SCADA) based controller 920 to direct movement and facilitate data analysis.

The system 100 includes an initial work cell sensor 185 positioned to monitor the initial work cell 30*a* for presence of a ready-to-move condition, see FIG. 2. The initial work cell sensor 185 may include at least one of a motion sensor 183, a laser sensor 181, a pressure sensor 187, a radar device 189, an RFID device 191, and a wireless device 193. The initial work cell sensor 185 may be operatively associated with control system 700 such that sensed data is communicated to the control system 700 for analysis and facilitating movement within the system 100.

Referring to FIG. 2, the system 100 includes a subsequent work cell sensor 195 positioned to monitor the subsequent work cell 30*b* for presence of a ready-to-receive condition. The subsequent work cell sensor 195 may include at least one of a motion sensor 183, a laser sensor 181, a pressure sensor 187, a radar device 189, an RFID device 191, and a wireless device 193. The subsequent work cell sensor 195 may be operatively associated with control system 700 such that sensed data is communicated to the control system 700 for analysis and facilitating movement within the system 100.

Referring to FIG. 9, the system 100 includes a gantry 200 configured to interface with the support beam 110 and move the support beam 110 from the initial work cell 30*a* to the subsequent work cell 30*b* once both the ready-to-move condition and the ready-to-receive condition are present.

Referring to FIG. 4, in one example, the support beam 110 of system 100 includes a first coupling feature 122 and the gantry 200 includes a second coupling feature 124, see FIG. 6. The gantry interfaces with the support beam 110 by engaging the first coupling feature 122 with the second coupling feature 124. The first coupling feature 122 on the support beam 110 may include a male coupling portion 122*a* and the second coupling feature 124 on the gantry 200 may include a female coupling portion 124*a*.

Referring to FIG. 9, in one or more examples, the gantry 200 includes a first elongated rail member 210 and a second elongated rail member 220 moveably engaged with the first elongated rail member 210. The system 100 further includes a trolley 275 moveably engaged with the second elongated rail member 220. In one example, the gantry 200 is configured to move the support beam 110 in only two directions, the two directions defining a plane P that is generally perpendicular to a vertical axis V of the manufacturing environment 10.

Referring to FIG. 2, in one or more examples, the plurality of work cells 30 of the system 100 is arranged along a longitudinal manufacturing environment axis A. Further, the first elongated rail member 210, FIG. 9, is aligned with the longitudinal manufacturing environment axis A. In one or more examples, the second elongated rail member 220 is transverse to the first elongated rail member 210 and moves relative to the first elongated rail member 210 along the longitudinal manufacturing environment axis A.

Figure 12:
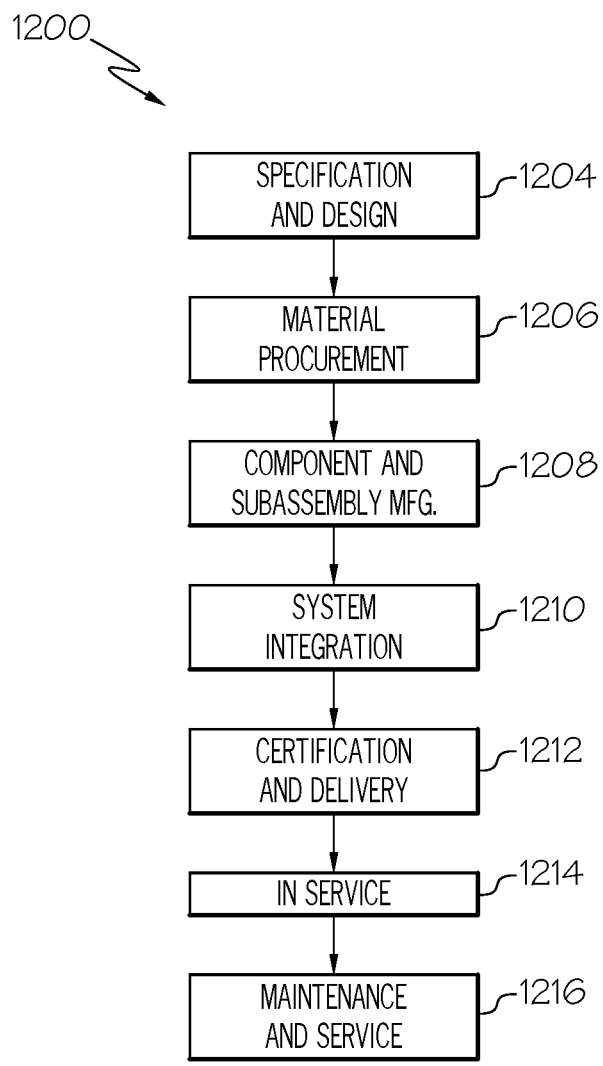
FIG. 12 is a flow diagram of an aircraft manufacturing and service methodology.
Figure 13:
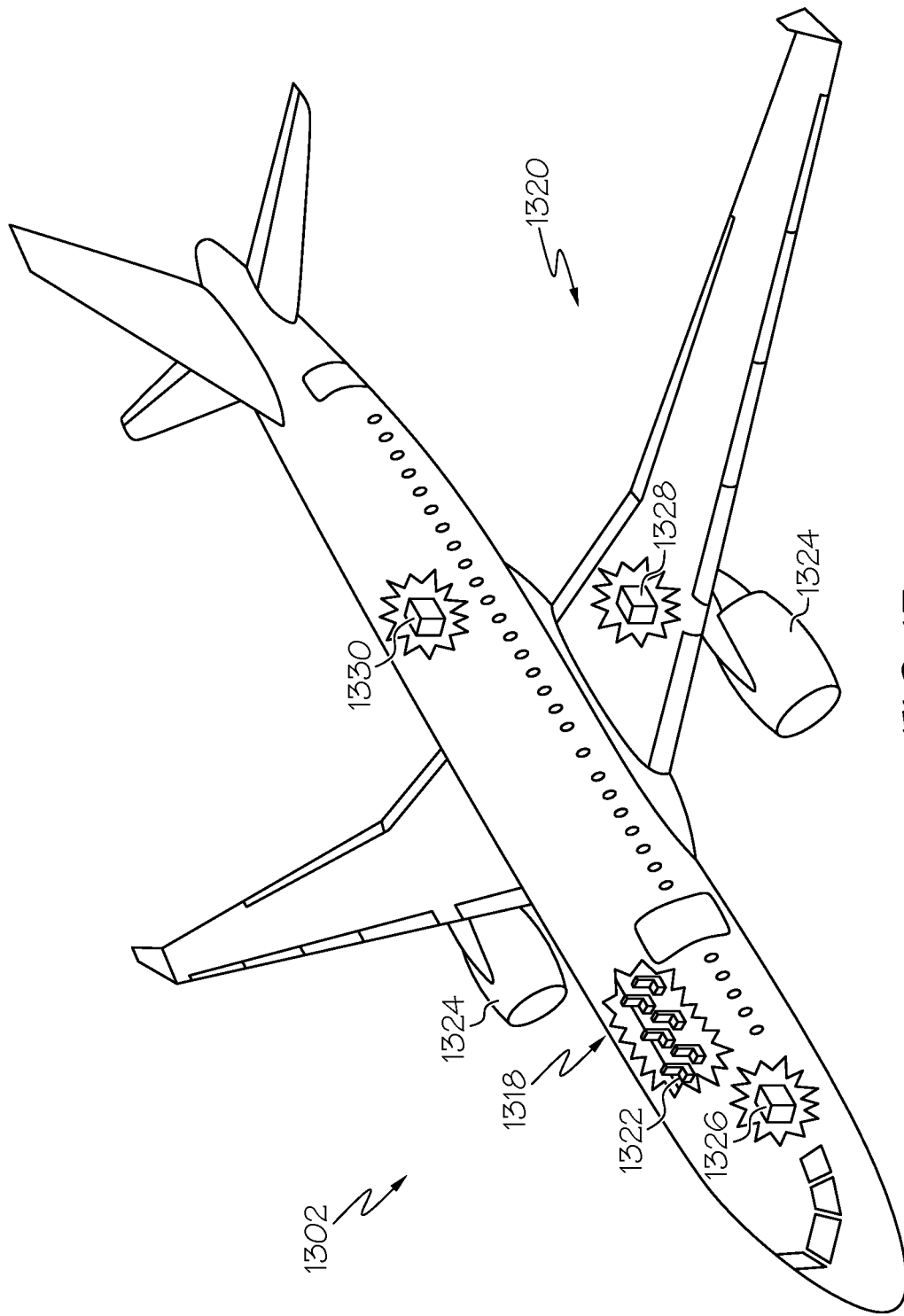
FIG. 13 is a schematic illustration of an aircraft.

Examples of the subject matter disclosed herein may be described in the context of aircraft manufacturing and service method 1200 as shown in FIG. 12 and aircraft 1302 as shown in FIG. 13. During pre-production, service method 1200 may include specification and design (block 1204) of aircraft 1302 and material procurement (block 1206). During production, component and subassembly manufacturing (block 1208) and system integration (block 1210) of aircraft 1302 may take place. Thereafter, aircraft 1302 may go through certification and delivery (block 1212) to be placed in service (block 1214). While in service, aircraft 1302 may be scheduled for routine maintenance and service (block 1216). Routine maintenance and service may include modification, reconfiguration, refurbishment, etc. of one or more systems of aircraft 1302.

Each of the processes of service method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1302 produced by service method 1200 may include airframe 1318 with a plurality of high-level systems 1320 and interior 1322. Examples of high-level systems 1320 include one or more of propulsion system 1324, electrical system 1326, hydraulic system 1328, and environmental system 1330. Any number of other systems may be included. Although an aerospace example is shown, the principles disclosed herein may be applied to other industries, such as the automotive industry. Accordingly, in addition to aircraft 1302, the principles disclosed herein may apply to other vehicles, e.g., land vehicles, marine vehicles, space vehicles, etc.

The disclosed systems and methods for supporting a workpiece in a manufacturing environment may be employed during any one or more of the stages of the manufacturing and service method 1200. For example, components or subassemblies corresponding to component and subassembly manufacturing (block 1208) may be fabricated or manufactured in a manner similar to components or subassemblies produced while aircraft 1302 is in service (block 1214), such as by employing the disclosed systems and methods for supporting a workpiece 50 in a manufacturing environment 10. Also, one or more examples of the disclosed systems and methods for supporting a workpiece in a manufacturing environment may be utilized during production stages, i.e. component and subassembly manufacturing (block 1208) and system integration (block 1210), for example, by substantially expediting assembly of or reducing the cost of aircraft 1302. Similarly, one or more examples of the disclosed systems and methods for supporting a workpiece in a manufacturing environment may be utilized, for example and without limitation, while aircraft 1302 is in service (block 1214) and/or during maintenance and service (block 1216).

The disclosed systems and methods for supporting a workpiece in a manufacturing environment are described in the context of an aircraft. However, one of ordinary skill in the art will readily recognize that the disclosed systems and methods for supporting a workpiece in a manufacturing environment may be utilized for a variety of applications. For example, the disclosed systems and methods for supporting a workpiece in a manufacturing environment may be implemented in various types of vehicles including, e.g., helicopters, watercraft, passenger ships, automobiles, and the like.

Although various examples of the disclosed systems and methods for supporting a workpiece in a manufacturing environment have been shown and described, modifications may occur to those skilled in the art upon reading the specification. The present application includes such modifications and is limited only by the scope of the claims.

What is claimed is:

1. A method for transporting a workpiece from an initial work cell to a subsequent work cell in a manufacturing environment comprising a plurality of work cells, the workpiece being supported by a support beam, the method comprising:
   monitoring the initial work cell for presence of a ready-to-move condition using an initial work cell sensor, the ready-to-move condition at least indicating work on the workpiece within the initial work cell is complete;
   monitoring the subsequent work cell for presence of a ready-to-receive condition using a subsequent work cell sensor, the ready-to-receive condition at least indicating the subsequent work cell is devoid of a workpiece;
   when both the ready-to-move condition and the ready-to-receive condition are present, interfacing the support beam with a gantry;
   after the interfacing, moving the support beam from the initial work cell to the subsequent work cell using the gantry, wherein the moving comprises moving the support beam in directions defining a plane perpendicular to a vertical axis of the manufacturing environment; and
   after the support beam is in the subsequent work cell, positioning the support beam onto a first frame assembly and a second frame assembly.

2. The method of claim 1, further comprising:
   upon the presence of the ready-to-move condition, automatically generating a notification instructing all personnel to leave the initial work cell; and
   upon the presence of the ready-to-receive condition, automatically generating a notification instructing all personnel to leave the subsequent work cell,
   wherein:
      the generating the notification comprises at least one of generating an audible notification, generating a visual notification, and generating a wireless broadcast; and
      the ready-to-move condition is present in at least one of:
         when a signal is received indicating that work on the workpiece within the initial work cell is complete; and
         when the initial work cell is devoid of personnel; and
      the ready-to-receive condition is present in at least one of:
         when a signal is received indicating that the subsequent work cell is devoid of a workpiece;
         when the subsequent work cell is devoid of personnel.

3. The method of claim 1, wherein:
   the monitoring the initial work cell comprises monitoring at least one of a motion sensor, a laser sensor, a pressure sensor, a radar device, an RFID device, and a wireless device to ascertain presence of personnel within the initial work cell; and
   the monitoring the subsequent work cell comprises monitoring at least one of a laser sensor and a pressure sensor to ascertain presence of personnel within the subsequent work cell.

4. The method of claim 1, wherein:
   the support beam comprises a first coupling feature;
   the interfacing the support beam with the gantry comprises engaging the first coupling feature on the support beam with a second coupling feature on the gantry;
   the first coupling feature on the support beam comprises a male coupling portion, and
   the second coupling feature on the gantry comprises a female coupling portion.

5. The method of claim 4, wherein the interfacing the support beam with the gantry comprises at least one of sensing whether the second coupling feature on the gantry has securely engaged the first coupling feature on the support beam and interfacing using a feedback control loop.

6. The method of claim 1, wherein the support beam comprises at least two of a first coupling feature, and wherein the interfacing the support beam with the gantry comprises engaging the at least two of the first coupling feature on the support beam with at least two of a second coupling feature on the gantry.

7. The method of claim 1, wherein the gantry comprises:
a first elongated rail member;
a second elongated rail member moveably engaged with the first elongated rail member; and
a trolley moveably engaged with the second elongated rail member.

8. The method of claim 1, wherein:
the interfacing the support beam with the gantry comprises raising the support beam along the vertical axis into engagement with the gantry; and
the moving the support beam with the gantry comprises moving the support beam in only two directions, the two directions defining the plane that is perpendicular to the vertical axis of the manufacturing environment.

9. The method of claim 1
wherein the support beam is elongated along a longitudinal support beam axis and comprises a first end portion and a second end portion longitudinally opposed from the first end portion,
wherein the support beam comprises a first beam-side indexing feature proximate the first end portion and a second beam-side indexing feature proximate the second end portion,
wherein the first frame assembly comprises a first base portion, a first riser portion defining a first vertical axis, and a first carriage, the first carriage being connected to the first riser portion and moveable relative to the first riser portion along the first vertical axis, wherein the first carriage comprises a first frame-side indexing feature configured to engage with the first beam-side indexing feature, and
wherein the second frame assembly comprises a second base portion, a second riser portion defining a second vertical axis, and a second carriage, the second carriage being connected to the second riser portion and moveable relative to the second riser portion along the second vertical axis, wherein the second carriage comprises a second frame-side indexing feature configured to engage with the second beam-side indexing feature.

10. The method of claim 9, wherein:
the first beam-side indexing feature comprises a first male indexing feature,
the first frame-side indexing feature comprises a first female indexing feature sized and shaped to closely receive the first male indexing feature,
the positioning the support beam onto the first frame assembly comprises inserting the first male indexing feature into the first female indexing feature,
the second beam-side indexing feature comprises a second male indexing feature,
the second frame-side indexing feature comprises a second female indexing feature sized and shaped to closely receive the second male indexing feature, and
the positioning the support beam onto the second frame assembly comprises inserting the second male indexing feature into the second female indexing feature.

11. The method of claim 1, further comprising at least one of:
automatically, upon the presence of the presence of the ready-to-move condition, actuating personnel lockouts to inhibit ingress of personnel into the initial work cell; and
automatically, upon the presence of the presence of the ready-to-receive condition, actuating personnel lockouts to inhibit ingress of personnel into the subsequent work cell.

12. The method of claim 1, further comprising:
monitoring the subsequent work cell for presence of a second ready-to-move condition;
monitoring a still subsequent work cell for presence of a second ready-to-receive condition;
when both the second ready-to-move condition and the second ready-to-receive condition are present, interfacing the support beam with the gantry; and
after the interfacing, moving the support beam with the gantry from the subsequent work cell to the still subsequent work cell.

13. The method of claim 1, wherein the plurality of work cells comprises at least one of a trimming cell, a sanding cell, a washing cell, a non-destructive inspection cell, a painting cell, and a drilling cell, and an assembling cell.

14. The method of claim 1, wherein the workpiece is a wing panel of an aircraft.

15. A method for transporting a workpiece from an initial work cell to a subsequent work cell in a manufacturing environment comprising a plurality of work cells, the workpiece being supported by a support beam, the method comprising:
monitoring the initial work cell for presence of a ready-to-move condition using an initial work cell sensor, wherein the ready-to-move condition is present when work on the workpiece within the initial work cell is complete and the initial work cell is devoid of personnel;
monitoring the subsequent work cell for presence of a ready-to-receive condition using a subsequent work cell sensor, wherein the ready-to-receive condition is present when the subsequent work cell is devoid of a workpiece and devoid of personnel;
when both the ready-to-move condition and the ready-to-receive condition are present, engaging a first coupling feature on the support beam with a second coupling feature on a gantry; and
after the engaging the first coupling feature on the support beam with the second coupling feature on the gantry, moving the support beam from the initial work cell to the subsequent work cell using the gantry, wherein the moving comprises moving the support beam in directions defining a plane perpendicular to a vertical axis of the manufacturing environment; and
after the support beam is in the subsequent work cell, positioning the support beam onto a first frame assembly and a second frame assembly.

16. The method of claim 15, wherein the moving comprises moving the support beam in only two directions, the two directions defining the plane that is perpendicular to the vertical axis of the manufacturing environment.

17. A system for transporting a workpiece from an initial work cell to a subsequent work cell in a manufacturing environment comprising a plurality of work cells, the workpiece being supported by a support beam, the system comprising:

an initial work cell sensor positioned to monitor the initial work cell for presence of a ready-to-move condition, the ready-to-move condition at least indicating work on the workpiece within the initial work cell is complete;

a subsequent work cell sensor positioned to monitor the subsequent work cell for presence of a ready-to-receive condition, the ready-to-receive condition at least indicating the subsequent work cell is devoid of a workpiece;

a gantry configured to interface with the support beam and configured to move the support beam from the initial work cell to the subsequent work cell in directions defining a plane perpendicular to a vertical axis of the manufacturing environment after both the ready-to-move condition and the ready-to-receive condition are present; and a first frame assembly and a second frame assembly disposed in the subsequent work cell and configured to receive the support beam after the gantry moves the support beam to the subsequent work cell.

18. The system of claim 17, wherein:

the initial work cell sensor comprises at least one of a motion sensor, a laser sensor, a pressure sensor, a radar device, an RFID device, and a wireless device; and the subsequent work cell sensor comprises at least one of a motion sensor, a laser sensor, a pressure sensor, a radar device, an RFID device, and a wireless device.

19. The system of claim 17, wherein:

the support beam comprises a first coupling feature;

the gantry comprises a second coupling feature; and the gantry interfaces with the support beam by engaging the first coupling feature with the second coupling feature.

20. The system of claim 17 wherein the gantry is configured to move the support beam in two directions defining the plane that is perpendicular to the vertical axis of the manufacturing environment.

* * * * *